US007477693B2

(12) United States Patent
Subramaniam et al.

(10) Patent No.: US 7,477,693 B2
(45) Date of Patent: *Jan. 13, 2009

(54) REDUCED COMPLEXITY CHANNEL ESTIMATION FOR WIRELESS COMMUNICATION SYSTEMS

(75) Inventors: Anand Subramaniam, La Jolla, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/749,523

(22) Filed: May 16, 2007

(65) Prior Publication Data

US 2007/0211811 A1   Sep. 13, 2007

Related U.S. Application Data

(63) Continuation of application No. 10/691,826, filed on Oct. 22, 2003, now Pat. No. 7,236,535.

(60) Provisional application No. 60/427,896, filed on Nov. 19, 2002.

(51) Int. Cl.
*H04K 1/10* (2006.01)
*H04L 27/28* (2006.01)

(52) U.S. Cl. .................................. 375/260

(58) Field of Classification Search ............... 375/260, 375/316, 130, 340, 347; 370/330, 335, 203; 703/400, 607
See application file for complete search history.

(56) References Cited

U.S. PATENT DOCUMENTS

| 6,141,393 | A  | * | 10/2000 | Thomas et al. ............ 375/347 |
| 6,445,342 | B1 | * | 9/2002 | Thomas et al. ............ 342/367 |
| 6,839,727 | B2 | * | 1/2005 | Kechriotis ................ 708/400 |
| 7,039,001 | B2 | * | 5/2006 | Krishnan et al. ........... 370/203 |
| 7,236,535 | B2 | * | 6/2007 | Subramaniam et al. ..... 375/260 |
| 2004/0243657 | A1 | * | 12/2004 | Goren et al. .............. 708/607 |
| 2004/0248604 | A1 | * | 12/2004 | Vaidyanathan ............ 455/517 |
| 2006/0258403 | A1 | * | 11/2006 | Vaidyanathan ........... 455/562.1 |

* cited by examiner

*Primary Examiner*—Mohammad H Ghayour
*Assistant Examiner*—Lawrence B Williams
(74) *Attorney, Agent, or Firm*—Peng Zhu; Stanton Braden; Thomas R. Rouse

(57) ABSTRACT

Techniques to derive a channel estimate using substantially fewer number of complex multiplications than with a brute-force method to derive the same channel estimate. In one method, an intermediate vector B is initially derived based on K sub-vectors of a vector $\hat{H}$ for a channel frequency response estimate and at least two DFT sub-matrices for a DFT matrix W, where K>1. An intermediate matrix A for the DFT matrix W is also obtained. A least square channel impulse response estimate is then derived based on the intermediate vector B and the intermediate matrix A. In one implementation, the intermediate vector B is obtained by first computing DFTs of a matrix $\hat{H}_{T \times L}$, which is formed based on the vector $\hat{H}$, to provide a matrix $G_{L \times L}$. Inner products between the columns of a base DFT sub-matrix $W_1$ and the rows of the matrix $G_{L \times L}$ are then computed to obtain the entries of the intermediate vector B.

18 Claims, 6 Drawing Sheets

REDUCED COMPLEXITY CHANNEL ESTIMATION FOR WIRELESS COMMUNICATION SYSTEMS

CROSS-REFERENCE TO RELATED APPLICATION

This application is a continuation of U.S. patent application Ser. No. 10/691,826, filed Oct. 22, 2003 now U.S. Pat. No. 7,236,535, which claims the benefit of U.S. Provisional Patent Application Ser. No. 60/427,896, filed Nov. 19, 2002, both of which are incorporated herein by reference in their entirety.

BACKGROUND

I. Field

The present invention relates generally to data communication, and more specifically to techniques for performing channel estimation with reduced complexity.

II. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiple access (OFDMA) systems.

Orthogonal frequency division multiplexing (OFDM) effectively partitions the overall system bandwidth into a number of (N) orthogonal subbands. These subbands are also referred to as tones, frequency bins, and frequency subchannels. With OFDM, each subband is associated with a respective subcarrier upon which data may be modulated. Each subband may thus be viewed as an independent transmission channel that may be used to transmit data.

In a wireless communication system, an RF modulated signal from a transmitter may reach a receiver via a number of propagation paths. For an OFDM system, the N subbands may experience different effective channels due to different effects of fading and multipath and may consequently be associated with different complex channel gains.

An accurate estimate of the response of the wireless channel between the transmitter and the receiver is normally needed in order to effectively transmit data on the available subbands. Channel estimation is typically performed by sending a pilot from the transmitter and measuring the pilot at the receiver. Since the pilot is made up of symbols that are known a priori by the receiver, the channel response can be estimated as the ratio of the received pilot symbol over the transmitted pilot symbol for each subband used for pilot transmission.

Pilot transmission represents overhead in a wireless communication system. Thus, it is desirable to minimize pilot transmission to the extent possible. However, because of noise and other artifacts in the wireless channel, a sufficient amount of pilot needs to be transmitted in order for the receiver to obtain a reasonably accurate estimate of the channel response. Moreover, the pilot transmission needs to be repeated to account for variations in the channel over time due to fading and changes in the multipath constituents. Consequently, channel estimation normally consumes a noticeable portion of the system resources.

In an OFDM system, to reduce the amount of overhead for pilot, a pilot transmission may be sent on a group of designated subbands, which may be only a subset of the available subbands. An initial estimate of the channel response may be obtained for the designated subbands based on the pilot transmission. Signal processing may then be performed to obtain an enhanced channel response for a group of desired subbands, which typically includes the subbands to be used for data transmission. The signal processing may further perform noise averaging to obtain a more accurate estimate of the channel response. As described in detail below, depending on the number of designated subbands used for pilot transmission and the impulse response of the channel, the signal processing may be computationally intensive and require a large number of complex multiplications.

There is therefore a need in the art for techniques to more efficiently derive an estimate of the channel response in a wireless communication system, such as an OFDM system.

SUMMARY

Techniques are provided herein to derive a channel estimate using substantially fewer numbers of complex multiplications than with a brute-force method to derive the same channel estimate. This channel estimate may be a least square estimate of the impulse response of a wireless channel, which may be derived based on an initial frequency response estimate $\hat{H}$ of the wireless channel. As described in detail below, the least square channel impulse response estimate may be derived by a matrix multiplication between the vector $\hat{H}$ and a matrix $\underline{\tilde{W}}^{ls}$, which is derived based on a discrete Fourier transform (DFT) matrix $\underline{\tilde{W}}$. The structure of the matrix $\underline{\tilde{W}}$ can be exploited to decompose the matrix multiplication $\underline{\tilde{W}}^{ls}\hat{H}$ is into a sum of matrix multiplications between smaller sub-matrices of $\underline{\tilde{W}}$ and smaller sub-vectors of $\hat{H}$. The properties of the sub-matrices of $\underline{\tilde{W}}$ can be exploited to simplify the computation. The net result is fewer number of complex multiplications required to obtain the least square channel impulse response estimate.

In one embodiment, a method is provided for deriving an estimate of a wireless channel in a wireless communication system (e.g., an OFDM system). In accordance with the method, an intermediate vector $\underline{B}$ is initially obtained, which is derived based on K sub-vectors of the vector $\hat{\underline{H}}$ for a first channel estimate (e.g., a channel frequency response estimate) and at least two DFT sub-matrices for the DFT matrix $\underline{\tilde{W}}$, where K is an integer greater than one. An intermediate matrix A for the DFT matrix $\underline{\tilde{W}}$ is also obtained. A second channel estimate (e.g., a least square channel impulse response estimate) is then derived based on the intermediate vector $\underline{B}$ and the intermediate matrix $\underline{A}$.

In one implementation, the intermediate vector $\underline{B}$ is obtained by first computing DFTs of a first matrix $\hat{\underline{H}}_{T \times L}$, which is formed based on the vector $\hat{\underline{H}}$, to provide a second matrix $\underline{G}_{L \times L}$. Inner products between the columns of a base DFT sub-matrix $\underline{W}_1$ and the rows of the second matrix $\underline{G}_{L \times L}$ are then computed to obtain the entries of the intermediate vector $\underline{B}$. Details of this implementation are described below.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The channel estimation techniques described herein may be used for any communication system with multiple subbands. For clarity, these techniques are described specifically for an OFDM system.

Figure 1:
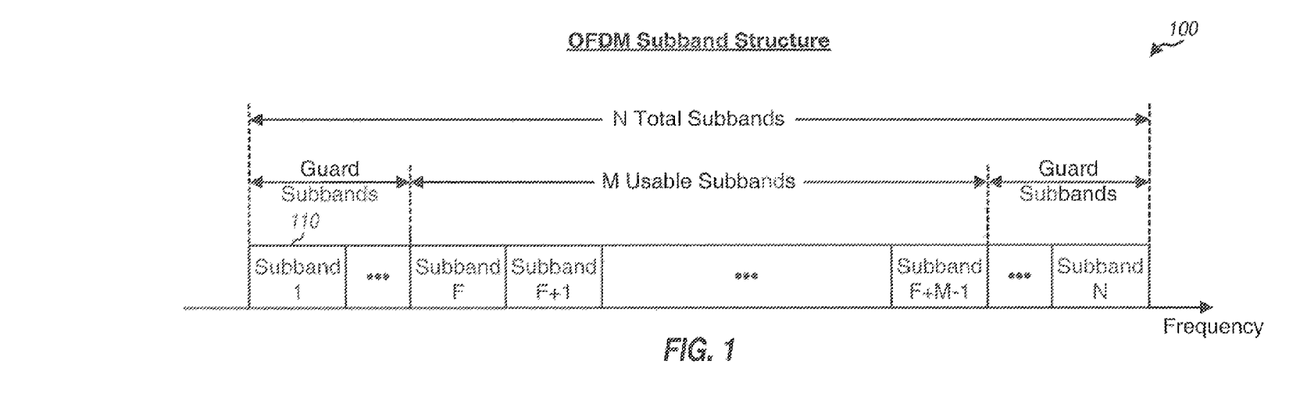
FIG. 1 shows an OFDM subband structure.

FIG. 1 shows a subband structure 100 that may be used for an OFDM system. The OFDM system has an overall system bandwidth of W MHz, which is partitioned into N orthogonal subbands using OFDM. Each subband has a bandwidth of W/N MHz. In a typical OFDM system, only M of the N total subbands are used for data transmission, where M<N. These M usable subbands are also referred to as data subbands. The remaining N–M subbands are not used for data transmission and serve as guard subbands to allow the OFDM system to meet spectral mask requirements. The M usable subbands include subbands F through F+M−1.

For OFDM, the data to be transmitted on each subband is first modulated (i.e., symbol mapped) using a particular modulation scheme selected for use for that subband. Signal values of zero are provided for the N−M unused subbands. For each symbol period, the M modulation symbols and N−M zeros for all N subbands are transformed to the time domain using an inverse fast Fourier transform (IFFT) to obtain a "transformed" symbol that includes N time-domain samples. The duration of each transformed symbol is inversely related to the bandwidth of each subband. For example, if the system bandwidth is W=20 MHz and N=256, then the bandwidth of each subband is 78.125 KHz (or W/N MHz) and the duration of each transformed symbol is 12.8 µsec (or N/W µsec).

The N subbands of the OFDM system may experience different channel conditions (e.g., different effects due to fading and multipath) and may be associated with different complex channel gains. An accurate estimate of the channel response is normally needed in order to properly process (e.g., decode and demodulate) data at the receiver.

For clarity, in the following description, lower-case letters are used for indices, upper-case letters are used for constants, and bolded and underlined lower-case and upper-case letters are used for vectors and matrices.

The wireless channel in the OFDM system may be characterized by either a time-domain channel impulse response, h, or a corresponding frequency-domain channel frequency response, H. The channel frequency response H is the discrete Fourier transform (DFT) of the channel impulse response h. This relationship may be expressed in matrix form, as follows:

$$H = Wh, \quad \text{Eq (1)}$$

where h is an (N×1) vector for the impulse response of the wireless channel between a transmitter and a receiver in the OFDM system;

H is an (N×1) vector for the frequency response of the wireless channel; and

W is an (N×N) DFT matrix used to perform the DFT on the vector h to obtain the vector H.

The DFT matrix W is defined such that the (n, m)-th entry, $w_{n,m}^N$, is given as:

$$w_{n,m}^N = e^{-j2\pi \frac{(n-1)(m-1)}{N}}, \text{ for } n = \{1 \ldots N\} \text{ and } m = \{1 \ldots N\}, \quad \text{Eq (2)}$$

where n is a row index and m is a column index.

The vector h includes one non-zero entry for each tap of the channel impulse response. Thus, if the channel impulse response includes L taps, where L<N, then the first L entries of the vector h would be L non-zero values and the (N−L) following entries would be zeros.

Figure 2A:
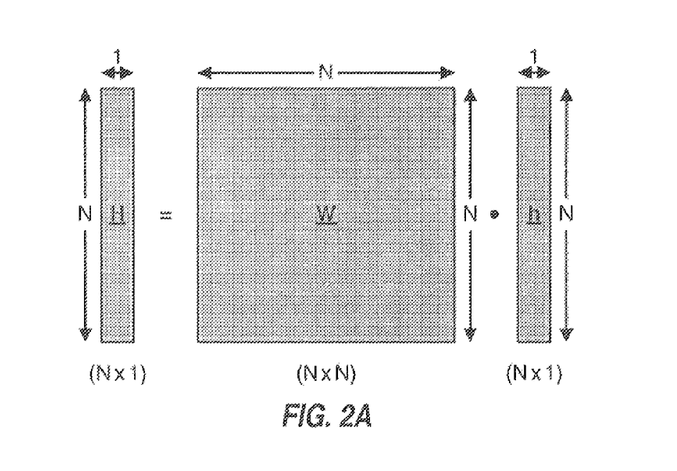
FIG. 2A shows the relationship between the frequency response and the impulse response of a wireless channel.

FIG. 2A graphically shows the relationship between the channel frequency response H and the channel impulse response h. The vector h includes N time-domain values for the impulse response of the wireless channel from the transmitter to the receiver, where some of the entries in h may be zeros. This vector h can be transformed to the frequency domain by pre-multiplying it with the matrix W. The vector H includes N frequency-domain values for the complex channel gains of the N subbands.

Figure 2B:
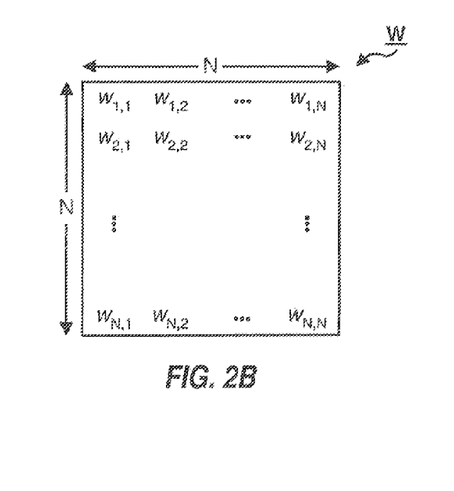
FIG. 2B graphically shows a DFT matrix $\underline{W}$.

FIG. 2B graphically shows the matrix W, which is an (N×N) matrix comprised of the elements $w_{n,m}^N$, for n={1 . . . N} and m={1 . . . N}, which are defined in equation (2). The superscript "$^N$" is not shown in FIG. 2B for clarity. Each row of the matrix W corresponds to one of the N total subbands.

The impulse response of the wireless channel can be characterized by L taps, where L is typically much less than the number of total subbands (i.e., L<N). That is, if an impulse is applied to the wireless channel by the transmitter, then L time-domain samples (at the sample rate of W) would be sufficient to characterize the response of the wireless channel based on this impulse stimulus. The number of taps L for the channel impulse response is dependent on the delay spread of the system, with a longer delay spread corresponding to a larger value for L.

Because only L taps are needed for the channel impulse response, the channel frequency response H lies in a subspace of dimension L (instead of N). More specifically, the frequency response of the wireless channel may be fully characterized based on the channel gains for as few as L appropriately selected subbands, instead of all N subbands. Even if more than L channel gains are available, an enhanced estimate of the frequency response of the wireless channel may be obtained by suppressing the noise components outside this subspace.

In one channel estimation technique, a more accurate estimate of the frequency response of a wireless channel is obtained based on a 3-step process. In the first step, an initial estimate of the channel frequency response, $\hat{H}$, is obtained based on the received and transmitted pilot symbols for each of S designated subbands, where S is an integer selected such that L≦S≦M. The S designated subbands may include all or only a subset of the M usable subbands. The initial channel frequency response estimate, $\hat{H}$, may be expressed as:

$$\hat{H} = r_s/x_s = H_s + n_s/x_s, \quad \text{Eq (3)}$$

where $r_s$ is a "receive" vector with S entries for the symbols received on the S designated subbands;

$x_s$ is a "transmit" vector with S entries for the symbols transmitted on the S designated subbands;

$H_s$ is an (S×1) vectors that includes only S entries of the (N×1) vector H for the S designated subbands;

$n_s$ is a vector with S entries for additive white Gaussian noise (AWGN) received on the S designated subbands; and $a_s/b_s = [a_1/b_1 \ a_2/b_2 \ldots a_s/b_s]^T$, which includes S ratios for the S designated subbands.

In the second step, a least square estimate of the impulse response of the wireless channel, $\hat{h}^{ls}$, is obtained based on the following optimization:

$$\underline{\hat{h}}^{ls} = \min_{\underline{h}_j} \left\| \underline{\hat{H}} - \underline{\tilde{W}} \, \underline{h}_j \right\|^2, \qquad \text{Eq (4)}$$

where $\underline{h}_j$ is an (L×1) vector for a hypothesized impulse response of the channel;

$\tilde{W}$ is an (S×L) sub-matrix of the (N×N) matrix W; and $\hat{h}^{ls}$ is an (L×1) vector for the least square channel impulse response estimate.

Figure 3A:
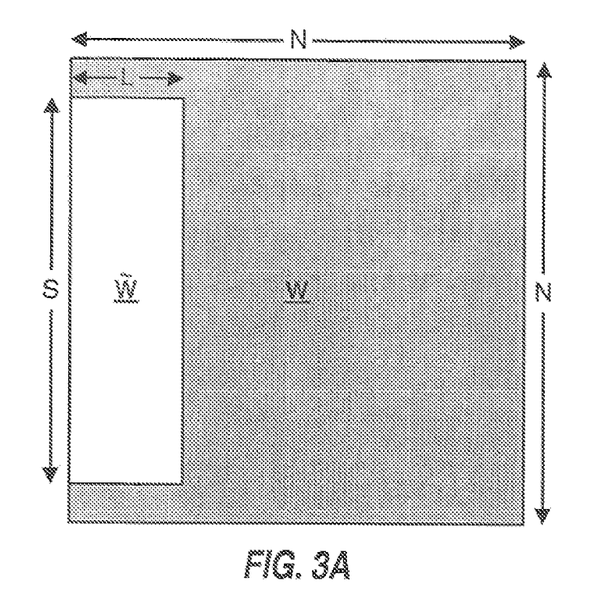
FIG. 3A graphically shows the relationship between DFT matrices $\underline{\tilde{W}}$ and $\underline{W}$.

FIG. 3A graphically shows the relationship between the matrices $\tilde{W}$ and W. The S rows of the matrix $\tilde{W}$ are the S rows of the matrix W corresponding to the S designated subbands. The L columns of the matrix $\tilde{W}$ are the first L columns of the matrix W.

The solution to equation (4) that results in the minimum mean square error (or more specifically, the minimum Euclidean norm) may be expressed as:

$$\hat{\underline{h}}^{ls} = (\tilde{W}^H \tilde{W})^{-1} \tilde{W}^H \hat{\underline{H}} = \tilde{W}^{ls} \hat{\underline{H}}, \qquad \text{Eq (5)}$$

where $\tilde{W}^{ls}$ is an (L×S) matrix defined as $\tilde{W}^{ls} = (\tilde{W}^H \tilde{W})^{-1} \tilde{W}^H$.

In the third step, an enhanced estimate of the frequency response of the wireless channel, $\hat{H}^{ls}$, is obtained based on the least square channel impulse response estimate, $\hat{h}^{ls}$, as follows:

$$\hat{\underline{H}}^{ls} = \check{W} \hat{\underline{h}}^{ls}, \qquad \text{Eq (6)}$$

where $\check{W}$ is a (Q×L) sub-matrix of the (N×N) matrix W; and $\hat{H}^{ls}$ is a (Q×1) vector for the enhanced channel frequency response estimate for Q desired subbands.

The Q rows of the matrix $\check{W}$ are the Q rows of the matrix W corresponding to the Q subbands for which the enhanced channel frequency response estimate is desired. In general, the matrix $\check{W}$ may include any number and any combination of rows of the matrix W. For example, the matrix $\check{W}W$ may include only the S rows of the matrix $\tilde{W}$, the S rows of the matrix $\tilde{W}$ plus one or more additional rows, the M rows of the matrix W for the M usable subbands, and so on. The group of S designated subbands may thus be the same or different from the group of Q desired subbands.

Equation (6) indicates that the enhanced channel frequency response estimate $\hat{H}^{ls}$ if may be obtained for Q desired subbands based on the least square channel impulse response estimate $\hat{h}^{ls}$ that includes only L entries, where L is typically less than S and Q and may be much less than S and Q.

The 3-step channel estimation technique is described in further detail in U.S. patent application Ser. No. 10/340,130, entitled "Channel Estimation for OFDM Communication Systems," filed Jan. 10, 2003, now U.S. Pat. No. 7,039,001.

The reduced complexity channel estimation techniques described herein may also be used in conjunction with pilot transmission schemes described in U.S. patent application Ser. No. 10/340,507, entitled "Uplink Pilot and Signaling Transmission in Wireless Communication Systems," filed Jan. 10, 2003, now U.S. Pat. No. 6,928,062. Both of these patent applications are assigned to the assignee of the present application and incorporated herein by reference.

An OFDM system may be designed with a relatively large number of subbands. For example, an OFDM system may be designed with 256 total subbands (i.e., N=256) and 224 usable subbands (i.e., M=224). In an example design, S may be selected to be equal to 224 for the downlink (i.e., $S_{dl}$=224) and equal to 32 for the uplink (i.e., $S_{ul}$=32). The number of total subbands may be given with respect to L such that N=L·T. The number of designated subbands may also be given with respect to L such that S=K·L. For the example design described above with L=16 and T=16, K would be equal to 14 for the downlink and to 2 for the uplink (i.e., $S_{dl}$=14L and $S_{ul}$=2L).

A straightforward or brute-force method for deriving the estimate $\hat{h}^{ls}$ using equation (5) would require $C_{bf}$=L·S complex multiplications for the matrix multiply between the (L×S) matrix $\tilde{W}^{ls}$ and the (S×1) vector $\hat{H}$. This is because each of the L elements of the vector $\hat{h}^{ls}$ requires S complex multiplications for the inner product between one row of the matrix $\tilde{W}^{ls}$ and the vector $\hat{H}$. For the example OFDM system described above, the number of complex multiplications required to derive the estimate $\hat{h}^{ls}$ can be given as $C_{bf}$=L·L·K=16·16·K=256K, where K=14 for the downlink and K=2 for the uplink. A large number of complex multiplications may thus be required to derive the estimate $\hat{h}^{ls}$, especially for the downlink.

Techniques are provided herein to derive the estimate $\hat{h}^{ls}$ using substantially fewer numbers of complex multiplications than with the brute-force method. The structure of the matrix $\tilde{W}$ can be exploited to decompose the matrix multiplication $\tilde{W}^{ls}\hat{H}$ is in equation (5) into a sum of K matrix multiplications between smaller sub-matrices of $\tilde{W}$ and smaller sub-vectors of $\hat{H}$. The properties of the sub-matrices of $\tilde{W}$ can be exploited to simplify the computation. The net result is fewer number of complex multiplications required to obtain the estimate $\hat{h}^{ls}$, as described in detail below.

The (S×1) vector $\hat{H}$, where S=K·L, can be partitioned into K smaller (L×1) sub-vectors, as follows:

$$\hat{\underline{H}} = \begin{bmatrix} \hat{H}_1 \\ \hat{H}_2 \\ \vdots \\ \hat{H}_K \end{bmatrix}. \qquad \text{Eq (7)}$$

Each sub-vector $\hat{H}_k$, for k={1 ... K}, may be expressed as:

$$\hat{H}_k = [\hat{H}_{F+(k-1)L} \ \hat{H}_{F+(k-1)L+1} \ldots \hat{H}_{F+kL-1}]^T, \qquad \text{Eq (8)}$$

where $\hat{H}_{F+(k-1)L+j}$ is the estimated channel gain for subband F+(k−1)L+j, which may be obtained as shown in equation (3);

F is the index for the first usable subband, as shown in FIG. 1; and

"$T$" denotes the transpose.

The (S×L) matrix $\tilde{W}$, where S=K·L, can also be partitioned into K smaller (L×L) sub-matrices, as follows:

$$\tilde{W} = \begin{bmatrix} W_1 \\ W_2 \\ \vdots \\ W_K \end{bmatrix}. \qquad \text{Eq (9)}$$

Each sub-matrix $W_k$, for k={1 . . . K}, is formed based on a different set of L rows of the matrix $\tilde{W}$. The concatenation of the K sub-matrices $W_k$, for k={1 . . . K}, would make up the matrix $\tilde{W}$.

Figure 3B:
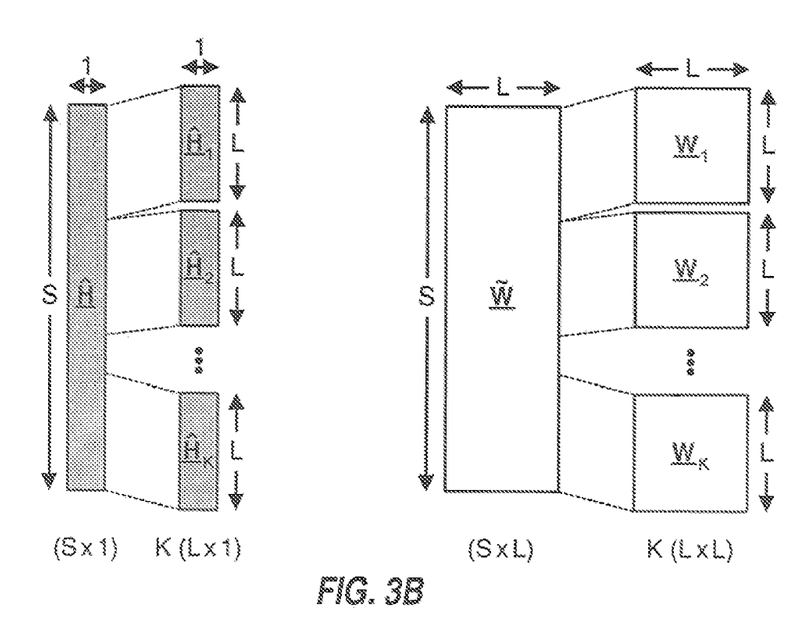
FIG. 3B graphically shows the partitioning of the vector $\underline{\hat{H}}$ into K sub-vectors and the DFT matrix $\underline{\tilde{W}}$ into K sub-matrices.

FIG. 3B graphically shows the partitioning of the vector $\hat{H}$ into K sub-vectors $\hat{H}_k$, for k={1 . . . K}, and the partitioning of the matrix $\tilde{W}$ into K sub-matrices $W_k$, for k={1 . . . K}.

It can be shown that the K sub-matrices $W_k$ are related to each other by the following relationship:

$$W_k = W_1 \Sigma_k, \text{ for } k = \{2 \ldots K\}, \qquad \text{Eq (10)}$$

where $\Sigma_k$ is an (L×L) diagonal matrix that may be given as:

$$\Sigma_k = diag\left(1\, e^{-j2\pi\frac{(k-1)L}{N}}\, e^{-j2\pi\frac{(k-1)2L}{N}}\, \ldots\, e^{-j2\pi\frac{(k-1)(L-1)L}{N}}\right), \qquad \text{Eq (11a)}$$

which may be rewritten as:

$$\Sigma_k = diag\left(1\, e^{-j2\pi\frac{(k-1)}{T}}\, e^{-j2\pi\frac{(k-1)\cdot 2}{T}}\, \ldots\, e^{-j2\pi\frac{(k-1)(L-1)}{T}}\right). \qquad \text{Eq (11b)}$$

As shown in equation (10), the K sub-matrices $W_k$, for k={1 . . . K}, are related to each other, and the matrices $W_k$, for k={2 . . . K}, may each be derived based on the "base" sub-matrix $W_1$.

It is observed that the diagonal elements of each matrix $\Sigma_k$, for k={1 . . . K}, constitute a "generalized" column of a (T×T) DFT matrix whose elements are defined as shown in equation (2), except that N is replaced by T. For a (T×T) DFT matrix, the row index n and the column index m each run from 1 to T. However, for a generalized column of the (T×T) DFT matrix, the row index n can take on any integer value, and the elements of the generalized column would simply be repeated if and when the row index n exceeds T. In equation (11b), L may or may not be equal to T. The row index n for an (L×T) DFT matrix may then extend past the row dimension of the (T×T) DFT matrix if L>T, which would then result in the generalized column.

A low-complexity least square (LCLS) method may be used to derive the least square channel impulse response estimate $\hat{h}^{ls}$. For the LCLS method, equation (5) is first rewritten using the sub-vectors $\hat{H}_k$ and the sub-matrices $W_k$, for k={1 . . . K}, as follows:

$$\hat{\underline{h}}^{ls} = \underbrace{\left(\sum_{k=1}^{K} W_k^H W_k\right)^{-1}}_{A} \underbrace{\left(\sum_{k=1}^{K} W_k^H \hat{H}_k\right)}_{B}. \qquad \text{Eq (12)}$$

Equation (12) may be expressed as the matrix product of an (L×L) matrix A and an (L×1) vector B. The matrix A may be expressed as:

$$\underline{A} = \left(\sum_{k=1}^{K} W_k^H W_k\right)^{-1} = \left(\tilde{W}^H \tilde{W}\right)^{-1}. \qquad \text{Eq (13)}$$

Since the matrix A does not depend on the vector $\hat{H}$, it can be computed off-line (i.e., pre-computed) and stored in a memory unit.

The vector B may be expressed as:

$$\underline{B} = \sum_{k=1}^{K} W_k^H \hat{H}_k. \qquad \text{Eq (14)}$$

Using the relationship for the sub-matrices $W_k$, for k={1 . . . K}, shown in equation (10), the vector B may be rewritten as:

$$\underline{B} = \sum_{k=1}^{K} \Sigma_k^H W_1^H \hat{H}_k = \sum_{k=1}^{K} \begin{bmatrix} 1 & 0 & \cdots & 0 \\ 0 & \alpha_k^2 & \cdots & \vdots \\ \vdots & \vdots & \ddots & 0 \\ 0 & \cdots & 0 & \alpha_k^L \end{bmatrix} \begin{bmatrix} w_1^H \hat{H}_k \\ w_2^H \hat{H}_k \\ \vdots \\ w_L^H \hat{H}_k \end{bmatrix}, \qquad \text{Eq (15)}$$

where $w_m$ is the m-th column of the sub-matrix $W_1$;

$$\alpha_k^m = e^{-j2\pi\frac{(k-1)(m-1)}{T}}, \text{ for } m = \{1 \ldots L\};$$

"H" denotes the conjugate transpose.

Equation (15) may be simplified as follows:

$$\underline{B} = \begin{bmatrix} \underline{w}_1^H \left(\sum_{k=1}^{K} \hat{H}_k\right) \\ \underline{w}_2^H \left(\sum_{k=1}^{K} \alpha_k^2 \hat{H}_k\right) \\ \vdots \\ \underline{w}_L^H \left(\sum_{k=1}^{K} \alpha_k^L \hat{H}_k\right) \end{bmatrix}. \qquad \text{Eq (16)}$$

As shown in equation (16), the vector B includes L inner products for the L entries of this vector. Each inner product is computed between the vector $w_m^H$ and the quantity $$\left(\sum_{k=1}^{K} \alpha_k^m \hat{H}_k\right)$$

to obtain $$w_m^H \left( \sum_{k=1}^{K} \alpha_k^m \hat{H}_k \right).$$

For each inner product, the quantity $$\left( \sum_{k=1}^{K} \alpha_k^m \hat{H}_k \right)$$

can be computed using one (T×T) DFT, as described below.

A (T×T) DFT can be computed using a radix-2 fast Fourier transform (FFT), which requires $C_{T\_radix2}=(T \cdot \log_2 T)/2$ complex multiplications. If the radix-2 FFT is used to compute for the vector B based on equation (16), then the number of required complex multiplications is $C_B=L \cdot [(T \cdot \log_2 T)/2+L]$, where the second L (inside the bracket on the right side of the equation) is for the L complex multiplications needed for the inner product between $w_m^H$ and $$\left( \sum_{k=1}^{K} \alpha_k^m \hat{H}_k \right),$$

and the first L (on the right side of the equation but outside the bracket) is for the L inner products for the vector B. $C_B$ may also be expressed as $C_B=L^2+L \cdot T \cdot \log_2 T/2$. The number of complex multiplications needed for the matrix multiply of the matrix A with the vector B is $C_{AB}=L \cdot L=L^2$. The total number of complex multiplications needed to compute the estimate $\hat{h}^{ls}$ using the LCLS method and radix-2 FFT and based on equation (16) may then be expressed as:

$$C_{total\_radix2}=C_{AB}+C_A=2L^2+L \cdot T \cdot \log_2 T/2 \qquad \text{Eq (17)}$$

For the example OFDM system described above, L=16, T=16, and K=14 for the downlink. The total number of complex multiplications needed to compute the estimate $\hat{h}^{ls}$ using the brute-force method based on equation (5) is $C_{bf}=16 \cdot 16 \cdot 14=3,584$. The total number of complex multiplications needed to compute the estimate $\hat{h}^{ls}$ using the LCLS method with radix-2 FFT and based on equation (16) is $C_{total\_radix2}=2 \cdot 16^2+16 \cdot 16 \cdot \log_2 16/2=1024$. This represents a reduction of 71.42% in the number of complex multiplications required to compute the estimate $\hat{h}^{ls}$.

The (T×T) DFT can also be computed using a radix-4 FFT, which requires $C_{T\_radix4}=((T/4-1)/(T/2))(T \cdot \log_2 T)$ complex multiplications. The total number of complex multiplications needed to compute the estimate $\hat{h}^{ls}$ using the LCLS method and radix-4 FFT and based on equation (16) is $C_{total\_radix4}=16 \cdot 16+16 \cdot [(3/8)(16 \cdot \log_2 16)+16]=896$. This represents a reduction of 75% in the number of complex multiplications required to compute the estimate $\hat{h}^{ls}$. Table 1 lists the number of complex multiplications required to compute the channel impulse response estimate $\hat{h}^{ls}$ using (1) the brute-force method and (2) the LCLS method with radix-2 and radix-4 FFTs. also shows the percentage savings achieved by the LCLS method over the brute-force method.

TABLE 1

| | Number of complex multiplications | | Savings |
|---|---|---|---|
| | Brute-force ($C_{bf}$) | LCLS ($C_{total}$) | (%) |
| Radix-2 FFT | 3,584 | 1,024 | 71.42 |
| Radix-4 FFT | 3,584 | 896 | 75.00 |

Figure 4:
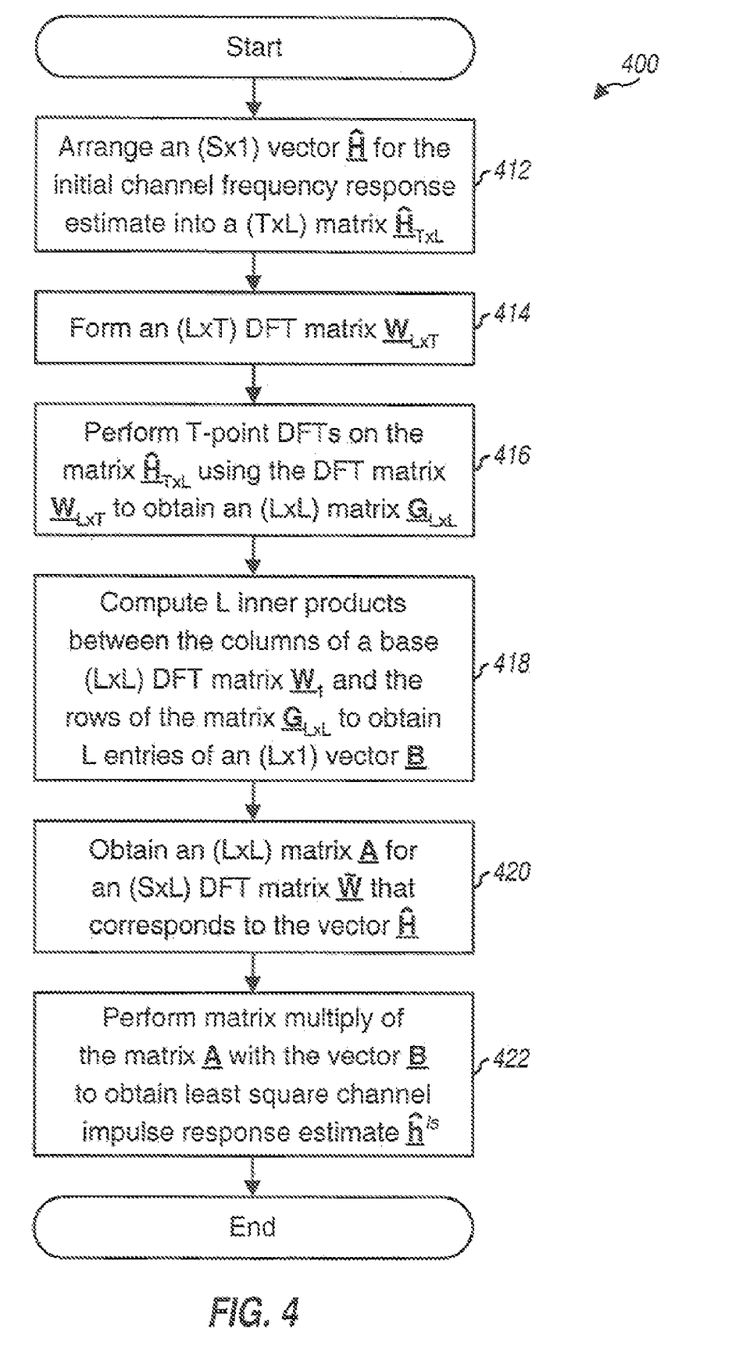
FIGS. 4 and 5 show two processes for deriving the least square channel impulse response estimate using a low complexity least square method.

FIG. 4 is a flow diagram of an embodiment of a process 400 for deriving a least square channel impulse response estimate using the low complexity least square method described above. In the following description, the inputs to the process are as follows:
Number of taps for the channel impulse response: L;
Number of total subbands: N=L·T;
Number of designated subbands: S=L·K; and
Initial channel frequency response estimate $\hat{H}$ with channel gains for the S designated subbands: $\hat{H}=[\hat{H}_F \; \hat{H}_{F+1} \; \ldots \; \hat{H}_{F+LK-1}]^T$.

The output of the process is the least square channel impulse response estimate, $\hat{h}^{ls}=[\hat{h}_1 \; \hat{h}_2 \; \ldots \; \hat{h}_L]^T$.

Initially, the S entries of the (S×1) vector $\hat{H}$ are arranged into a (T×L) matrix $\hat{H}_{T \times L}$ (step 412), as follows:

$$\hat{H}_{T \times L} = \begin{bmatrix} H_F & H_{F+1} & \ldots & H_{F+L-1} \\ H_{F+L} & H_{F+L+1} & \ldots & H_{F+2L-1} \\ \vdots & \vdots & \ddots & \vdots \\ H_{F+(L-1)K} & H_{F+(L-1)K+1} & \ldots & H_{F+LK-1} \\ 0 & 0 & \ldots & 0 \\ 0 & 0 & \ldots & 0 \end{bmatrix} \qquad \text{Eq (18)}$$

As shown in equation (18), the S entries of the vector $\hat{H}$ are written row-wise into the matrix $\hat{H}_{T \times L}$, starting in the first row and going from left to right. Each row of the matrix $\hat{H}_{T \times L}$ includes L consecutive entries of the vector $\hat{H}$. The matrix $\hat{H}_{T \times L}$ thus effectively partitions the vector $\hat{H}$ into K (L×1) sub-vectors $\hat{H}_k$, for k={1 ... K}, where each sub-vector $\hat{H}_k$ corresponds to one row of the matrix $\hat{H}_{T \times L}$. The matrix $\hat{H}_{T \times L}$ includes N entries for the N total subbands. Since S is typically less than N, only the first K rows of the matrix $\hat{H}_{T \times L}$ include non-zero values from the vector $\hat{H}$ and the last (N−S) entries in the matrix $\hat{H}_{T \times L}$ are filled with zeros, as shown in equation (18).

An (L×T) DFT matrix $W_{L \times T}$ is next formed (step 414). The (n,m)-th entry, $w_{n,m}^T$, of the matrix $W_{L \times T}$ is defined as:

$$w_{n,m}^T = e^{-j2\pi \frac{(n-1)(m-1)}{T}}, \text{ for } n=\{1 \ldots L\} \text{ and } m=\{1 \ldots T\}. \qquad \text{Eq (19)}$$

Each column of the matrix $W_{L \times T}$ corresponds to a generalized column of a (T×T) DFT matrix. The m-th column of the matrix $W_{L \times T}$ thus includes L entries that correspond to the diagonal elements of the matrix $\Sigma_k$ shown in equation (11b), where k=m for m=1 through K. Since the index k for the matrices $\Sigma_k$ runs from 1 through K but the index m for the columns of the matrix $W_{L \times T}$ runs from 1 through T, and since K≦T not all columns of the matrix $W_{L \times T}$ may be used, as described below.

Figure 3C:
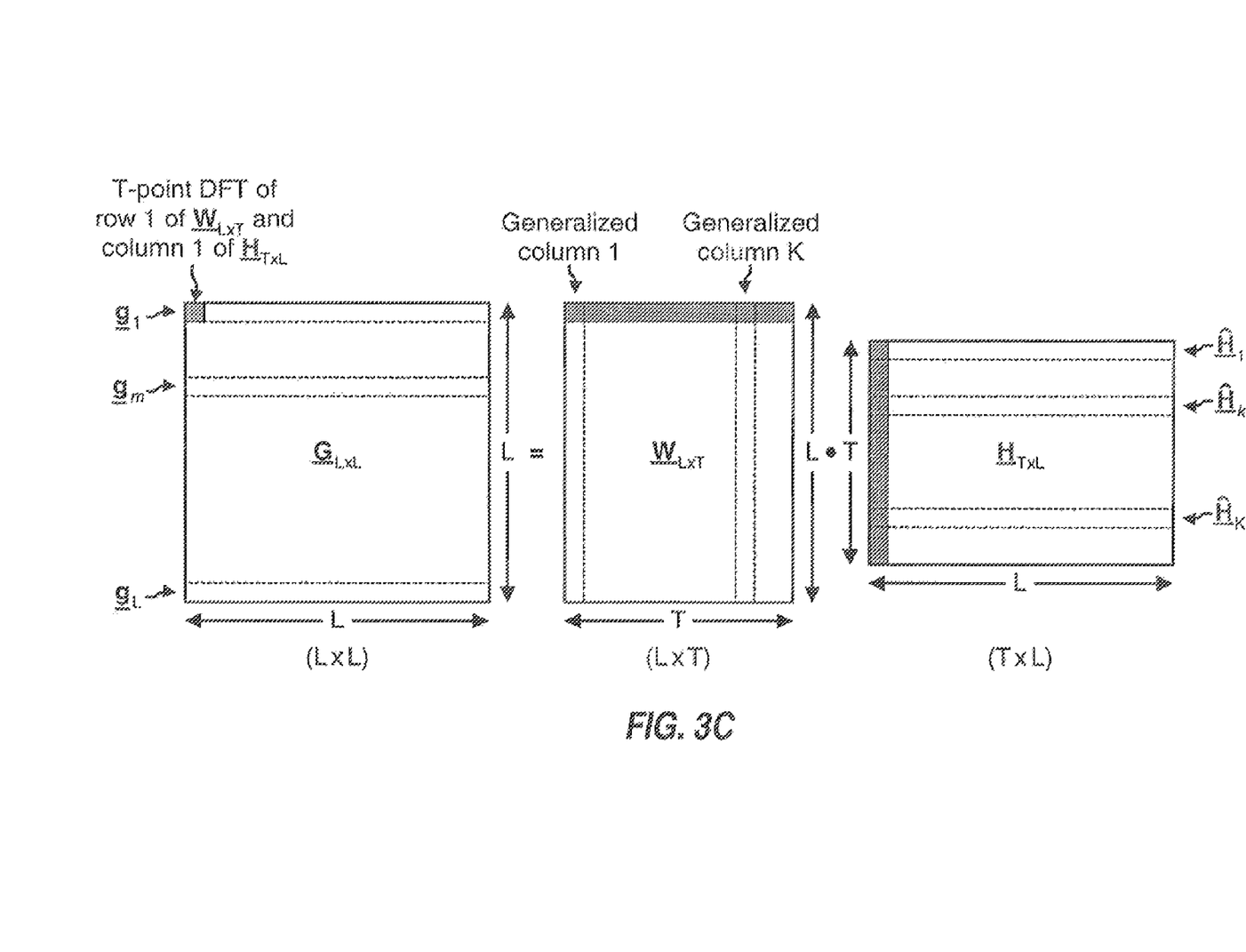
FIG. 3C graphically shows the relationship between the matrices $\underline{W}_{L \times T}$ and $\underline{\hat{H}}_{T \times L}$.

FIG. 3C graphically shows the relationship between the matrices $W_{L \times T}$ and $\hat{H}_{T \times L}$. The first K rows of the matrix $\hat{H}_{T \times L}$ correspond to the K sub-vectors $\hat{H}_k$, for k={1 ... K}. The T columns of the matrix $W_{L \times T}$ are generalized columns of a (T×T) DFT matrix. Each row of the matrix $W_{L \times T}$ is a "normal" row of the (T×T) DFT matrix.

T-point DFTs of the columns of the matrix $\hat{H}_{T \times L}$ are then computed using the matrix $W_{L \times T}$ (step 416). The DFTs may be expressed as:

$$G_{L \times L} = W_{L \times T} H_{T \times L} = \begin{bmatrix} g_1 \\ g_2 \\ \vdots \\ g_L \end{bmatrix} \qquad \text{Eq (20)}$$

where $g_m$, for m={1 ... L}, is an (L×1) row-vector for the m-th row of the matrix $G_{L \times L}$.

Each row-vector $g_m$ includes L entries, where each entry is obtained based on a T-point DFT of one row of the matrix $W_{L \times T}$ and one column of the matrix $\hat{H}_{T \times L}$, as shown in FIG. 3C. Equation (20) essentially performs the computation for the L summations shown in equation (16), such that $$g_m = \sum_{k=1}^{K} \alpha_k^m \hat{H}_k, \text{ for } m = \{1 \dots L\}. \qquad \text{Eq (21)}$$

The matrix $W_{L \times T}$ includes T columns for T generalized rows of a (T×T) DFT matrix. However, only the first K columns of the matrix $W_{L \times T}$ are used for the K matrices $\Sigma_k$, for k={1 ... K}. The last (T–K) columns of $W_{L \times T}$ are not used, since these columns are multiplied with the last (T–K) rows of zeros in the matrix $\hat{H}_{T \times L}$.

Each of the L entries of the vector B is then obtained by computing an inner product between conjugate transpose of a vector $w_m$ and a corresponding row-vector $g_m$ (step 418). This inner product may be expressed as:

$$b_m = w_m^H g_m^T = g_m w_m^*, \text{ for } m = \{1 \dots L\}, \qquad \text{Eq (22)}$$

where $w_m$ is the m-th column of the (L×L) sub-matrix $W_1$, and "*" denotes a conjugate. The sub-matrix $W_1$ is defined such that the (n,m)-th entry, $w_{n,m}^1$, is given as:

$$w_{n,m}^1 = e^{-j2\pi \frac{(n-1)(m+F-1)}{N}}, \qquad \text{Eq (23)}$$

for $n = \{1 \dots L\}$ and $m = \{1 \dots L\}$.

The result of step 418 is the vector $B = [b_1 \ b_2 \ \dots \ b_L]^T$.

The (L×L) matrix A may be pre-computed as shown in equation (13) and stored in a memory unit (step 420). The least square channel impulse response estimate $\hat{h}^{ls}$ may then be computed by performing a matrix multiply of the matrix A with the vector B (step 422). This matrix multiplication may be expressed as:

$$\hat{h}^{ls} = AB. \qquad \text{Eq (24)}$$

Figure 5:
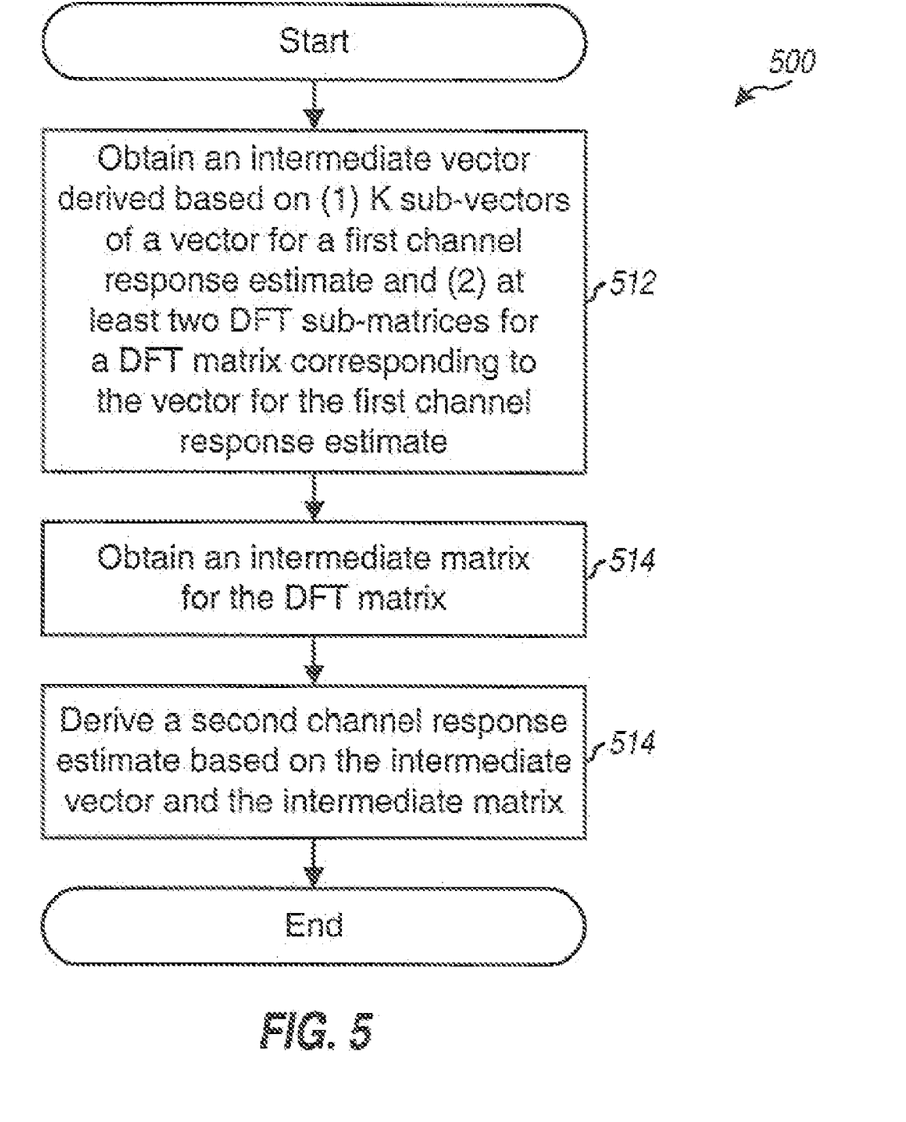

FIG. 5 is a flow diagram of another embodiment of a process 500 for deriving a least square channel impulse response estimate using the low complexity least square method.

Initially, an intermediate vector is derived based on (1) K sub-vectors of a vector for a first channel estimate and (2) at least two DFT sub-matrices for a DFT matrix (step 512). The intermediate vector may be B the K sub-vectors may be $\hat{H}_k$, for k={1 ... K}, the vector for the first channel estimate may be $\hat{H}$, the first channel estimate may be the initial channel frequency response estimate, the at least two DFT sub-matrices may be $W_k$, for k={1 ... K}, and the DFT matrix may be $\tilde{W}$. The intermediate vector B may then be obtained by (1) performing a matrix multiply of each of the K sub-vectors with a corresponding one of the K DFT sub-matrices to obtain a corresponding intermediate sub-vector $W_k^H \hat{H}_k$, and (2) accumulating K intermediate sub-vectors $W_k^H \hat{H}_k$, for k={1 ... K}, to obtain the intermediate vector B, as shown in equation (14).

Alternatively, the at least two DFT sub-matrices may be $W_{L \times T}$ and $W_1$. The intermediate vector B may then be obtained by (1) computing DFTs of a first matrix $\hat{H}_{T \times L}$, formed based on the vector $\hat{H}$ for the first channel estimate, to provide a second matrix $G_{L \times L}$, and (2) computing inner products between the columns of the base DFT sub-matrix $W_1$ and the rows of the second matrix $G_{L \times L}$ to obtain the intermediate vector B as shown in equations (21) and (22).

An intermediate matrix is then obtained, which is derived for the DFT matrix corresponding to the vector for the initial frequency response estimate (step 514). The intermediate matrix may be the matrix A, which may be derived as shown in equation (13). Again, the matrix A may be pre-computed, stored in a memory unit, and retrieved when needed.

A second response estimate is then derived based on the intermediate vector and the intermediate matrix (step 516). The second response estimate may be a least square channel impulse response estimate.

In the above description, the structure of the matrix $\tilde{W}$ is exploited to greatly reduce the complexity of the derivation of the least square channel impulse response estimate. The reduced complexity channel estimation techniques described herein may also be used to derive other channel estimates. For example, these techniques may possibly be used to derive the enhanced channel frequency response estimate shown in equation (6). In general, these techniques may be used for any problem where multiplication by a sub-matrix of the DFT matrix is involved. However, the gains achieved by these techniques may be dependent on the set-up of the problem.

As noted above, the channel estimation techniques described herein may be used for any communication system with multiple subbands, such as OFDM systems. Moreover, these techniques may be used for multiple-input multiple-output (MIMO) systems that employ multiple ($N_T$) transmit antennas and multiple ($N_R$) receive antennas for data transmission. For a MIMO system that utilizes OFDM, the response of a wireless MIMO channel may be given as H(k), for k={1 ... N}. Each matrix H(k) is an ($N_R \times N_T$) matrix with entries $H_{i,j}$, for i={1 ... $N_R$} and j={1 ... $N_T$}, where $H_{i,j}$ is the channel gain between the j-transmit antenna and the i-th receive antenna. The techniques described herein may be used to derive the channel response of each transmit/receive antenna pair.

Figure 6:
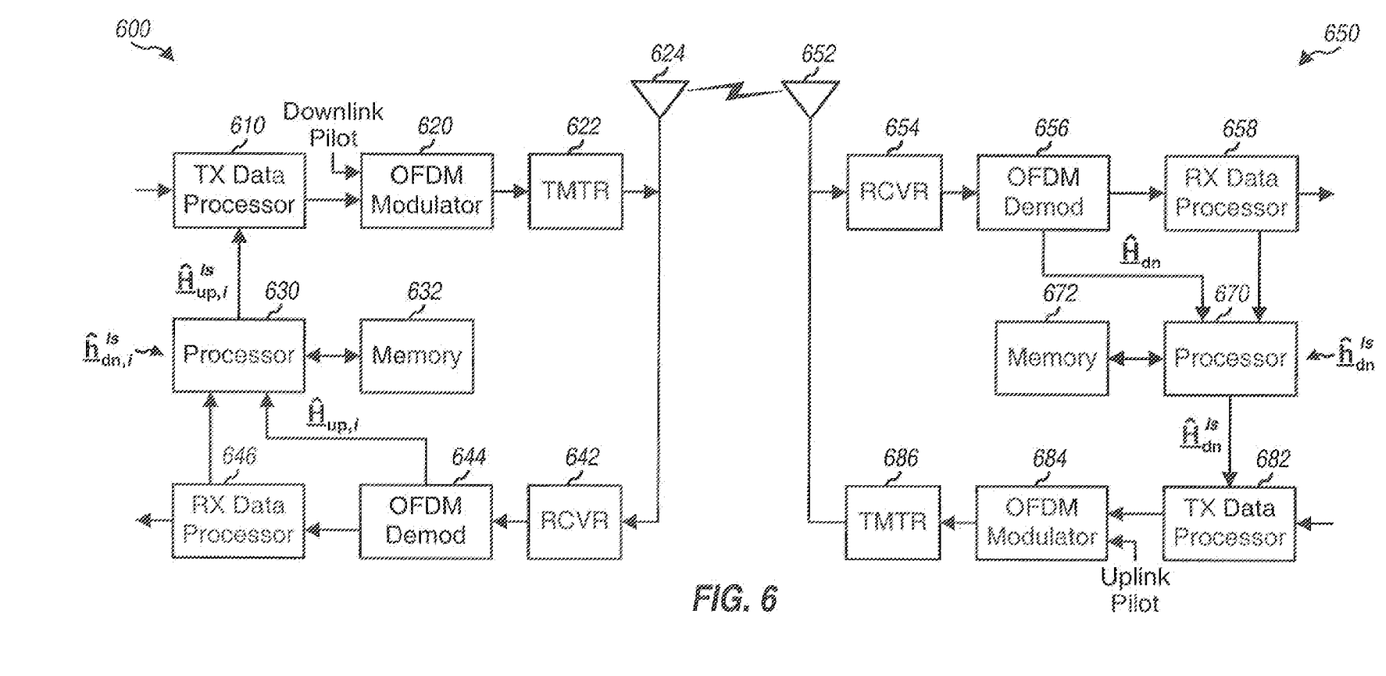
FIG. 6 shows a block diagram of an access point and a terminal in a wireless communication system.

FIG. 6 is a block diagram of an embodiment of an access point 600 and a terminal 650, which are capable of deriving the channel estimate using the techniques described herein.

On the downlink, at access point 600, traffic data is provided to a TX data processor 610, which formats, codes, and interleaves the traffic data to provide coded data. An OFDM modulator 620 then receives and processes the coded data and pilot symbols to provide a stream of OFDM symbols. The processing by OFDM modulator 620 may include (1) symbol mapping the coded data to form modulation symbols, (2) multiplexing the modulation symbols with pilot symbols, (3)

transforming the modulation symbols and pilot symbols to obtain transformed symbols, and (4) appending a cyclic prefix to each transformed symbol to form a corresponding OFDM symbol. For the downlink, the pilot symbols may be multiplexed with the modulation symbols using, for example, time division multiplexing (TDM). For TDM, the pilot symbols and modulation symbols are transmitted on different time slots. The pilot symbols may be transmitted on $S_{dn}$ designated subbands, where $S_{dn}$ may include all or a subset of the M usable subbands.

A transmitter unit (TMTR) 622 then receives and converts the stream of OFDM symbols into one or more analog signals and further conditions (e.g., amplifies, filters, and frequency upconverts) the analog signals to generate a downlink modulated signal suitable for transmission over the wireless channel. The downlink modulated signal is then transmitted via an antenna 624 to the terminals.

At terminal 650, the downlink modulated signal is received by antenna 652 and provided to a receiver unit (RCVR) 654. Receiver unit 654 conditions (e.g., filters, amplifies, and frequency downconverts) the received signal and digitizes the conditioned signal to provide samples. An OFDM demodulator 656 then removes the cyclic prefix appended to each OFDM symbol, transforms each recovered transformed symbol using an FFT, and demodulates the recovered modulation symbols to provide demodulated data. An RX data processor 658 then decodes the demodulated data to recover the transmitted traffic data. The processing by OFDM demodulator 656 and RX data processor 658 is complementary to that performed by OFDM modulator 620 and TX data processor 610, respectively, at access point 600.

OFDM demodulator 656 may further determine an initial frequency response estimate $\hat{H}_{dn}$ for the downlink channel, or provide the received pilot symbols that may be used to derive $\hat{H}_{dn}$. A processor 670 receives $\hat{H}_{dn}$ (or equivalent information) and may derive a least square impulse response estimate $\hat{h}_{dn}^{ls}$ of the wireless channel based on $\hat{H}_{dn}$ and using the low complexity least square method described above. Processor 670 may further obtain an enhanced frequency response estimate $\hat{H}_{dn}^{ls}$ for the downlink channel based on $\hat{h}_{dn}^{ls}$. The enhanced estimate $\hat{H}_{dn}^{ls}$ may thereafter be used for uplink data transmission and/or sent back to the access point for use for downlink data transmission.

On the uplink, traffic data is processed by a TX data processor 682 and provided to an OFDM modulator 684, which also receives pilot symbols. OFDM modulator 684 may then process the coded data and pilot symbols similar to that described for OFDM modulator 620. For the uplink, the pilot symbols may also be multiplexed with the modulation symbols using TDM. Moreover, the pilot symbols may be transmitted on only $S_{up,i}$ subbands that have been assigned to terminal 650 for pilot transmission.

A transmitter unit 686 then receives and processes the stream of OFDM symbols to generate an uplink modulated signal suitable for transmission over the wireless channel. The modulated signal is then transmitted via an antenna 652 to the access point.

At access point 600, the uplink modulated signal is processed by a receiver unit 642 to provide samples. These samples are then processed by an OFDM demodulator 644 to provide demodulated data, which are further processed by an RX data processor 646 to recover the transmitted traffic data. OFDM demodulator 644 may determine the initial frequency response estimate $\hat{H}_{up,i}$ for the uplink channel for each active terminal or provide the received pilot symbols that may be used to obtain $\hat{H}_{up,i}$. A processor 630 receives $\hat{H}_{up,i}$ (or equivalent information) for each active terminal, determines the least square channel impulse response estimate $\hat{h}_{up,i}^{ls}$ for the active terminal based on $\hat{H}_{up,i}$ and using the low complexity least square method, and further obtains the enhanced channel frequency response estimate $\hat{H}_{up,i}^{ls}$ based on $\hat{h}_{up,i}^{ls}$. The enhanced estimate $\hat{H}_{up,i}^{ls}$ may thereafter be used for downlink data transmission to the terminal and/or sent back to the terminal for use for uplink data transmission.

Processors 630 and 670 direct the operation at the access point and terminal, respectively. Memory units 632 and 672 provide storage for program codes and data used by controllers 630 and 670, respectively. Processors 630 and 670 may be designed to perform the computation described above to derive estimates of the uplink and downlink channels, respectively.

The reduced complexity channel estimation techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation techniques may be implemented with modules (e.g., procedures, functions, and so on) that perform the functions described herein. The software codes may be stored in a memory unit (e.g., memory units 632 or 672 in FIG. 6) and executed by a processor (e.g., processor 630 or 670). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method used in a wireless communication system, comprising:
    obtaining an intermediate vector derived based on K subvectors of a vector for a first channel estimate and at least two discrete Fourier transform (DFT) sub-matrices for a DFT matrix, wherein the DFT matrix corresponds to the vector for the first channel estimate and K is an integer greater than one; and
    obtaining an intermediate matrix for the DFT matrix.

2. The method of claim 1, wherein the intermediate vector is based on $$\underline{B} = \sum_{k=1}^{K} \underline{W}_k^H \underline{\hat{H}}_k,$$

where B is the intermediate vector,
$W_k$ is a k-th DFT sub-matrix among K DFT sub-matrices of the DFT matrix,
$\hat{H}_k$ is a k-th sub-vector among the K sub-vectors for the first channel estimate, and
"$H$" is a conjugate transpose.

3. The method of claim 1, wherein the at least two DFT sub-matrices include K DFT sub-matrices corresponding to the K sub-vectors, and wherein the obtaining the intermediate vector includes
performing a matrix multiply of each of the K sub-vectors with a corresponding one of the K DFT sub-matrices to obtain a corresponding intermediate sub-vector, and
accumulating K intermediate sub-vectors, obtained from the matrix multiply of the K sub-vectors with the K DFT sub-matrices, to obtain the intermediate vector.

4. The method of claim 1, wherein the obtaining the intermediate vector includes
computing discrete Fourier transforms of a first matrix, formed based on the vector for the first channel estimate, to provide a second matrix, and
computing inner products between columns of a base DFT sub-matrix and rows of the second matrix to obtain the intermediate vector.

5. The method of claim 4, wherein the DFT of the first matrix is computed using a radix-2 fast Fourier transform.

6. The method of claim 4, wherein the DFT of the first matrix is computed using a radix-4 fast Fourier transform.

7. The method of claim 1, wherein the intermediate matrix is based on $$\underline{A} = \left( \sum_{k=1}^{K} \underline{W}_k^H \underline{W}_k \right)^{-1},$$

where A is the intermediate matrix,
$W_k$ is a k-th DFT sub-matrix among K DFT sub-matrices of the DFT matrix, and
"$H$" is a conjugate transpose.

8. The method of claim 1, wherein the intermediate matrix is pre-computed.

9. The method of claim 1, wherein the wireless communication system is an orthogonal frequency division multiplexing (OFDM) communication system.

10. A method used in a wireless communication system, comprising:
obtaining an intermediate vector derived based on K sub-vectors of a vector for a first channel estimate and K discrete Fourier transform (DFT) sub-matrices of a DFT matrix, where K is an integer greater than one; and
obtaining an intermediate matrix derived based on the K DFT sub-matrices.

11. A method used in an orthogonal frequency division multiplexing (OFDM) communication, comprising:
forming a first matrix for an initial frequency response estimate of the wireless channel;
computing discrete Fourier transforms (DFTs) of the first matrix to obtain a second matrix;
computing inner products between a base DFT sub-matrix and the second matrix to obtain an intermediate vector; and
obtaining an intermediate matrix derived for a DFT matrix for the initial frequency response estimate.

12. An apparatus, comprising:
at least one processor configured to
obtain an intermediate vector derived based on K sub-vectors of a vector for a first channel estimate and at least two discrete Fourier transform (DFT) sub-matrices for a DFT matrix, wherein the DFT matrix corresponds to the vector for the first channel estimate and K is an integer greater than one, and
obtain an intermediate matrix for the DFT matrix; and
a memory coupled to the at least one processor.

13. An apparatus used in a wireless communication system comprising:
means for obtaining an intermediate vector derived based on K sub-vectors of a vector for a first channel estimate and at least two discrete Fourier transform (DFT) sub-matrices for a DFT matrix, wherein the DFT matrix corresponds to the vector for the first channel estimate and K is an integer greater than one; and
means for obtaining an intermediate matrix for the DFT matrix.

14. The apparatus of claim 13, wherein the means for obtaining the intermediate vector includes
means for computing a DFT of a first matrix, formed based on the vector for the first channel estimate, to provide a second matrix, and
means for computing inner products between columns of a base DFT sub-matrix and rows of the second matrix to obtain the intermediate vector.

15. A device in a wireless communication system, comprising:
a demodulator operative to receive a pilot transmission on a group of designated subbands; and
a processor operative to
obtain a first channel estimate for the group of designated subbands based on the received pilot transmission,
obtain an intermediate vector derived based on K sub-vectors of a vector for the first channel estimate and at least two discrete Fourier transform (DFT) sub-matrices for a DFT matrix, wherein the DFT matrix corresponds to the vector for the first channel estimate and K is an integer greater than one, and
obtain an intermediate matrix for the DFT matrix.

16. The device of claim 15, wherein the processor is further operative to
compute discrete Fourier transforms of a first matrix, formed based on the vector for the first channel estimate, to provide a second matrix, and
compute inner products between columns of a base DFT sub-matrix and rows of the second matrix to obtain the intermediate vector.

17. A processor-readable medium with instructions used in a wireless communication system, the instructions for:
obtaining an intermediate vector derived based on K sub-vectors of a vector for a first channel estimate and at least two discrete Fourier transform (DFT) sub-matrices for a DFT matrix, wherein the DFT matrix corresponds to the vector for the first channel estimate and K is an integer greater than one; and
obtaining an intermediate matrix for the DFT matrix.

18. The processor-readable medium of claim 17, further comprising instructions for:
deriving a second channel estimate based on the intermediate vector and intermediate matrix.

* * * * *

UNITED STATES PATENT AND TRADEMARK OFFICE
CERTIFICATE OF CORRECTION

| | | |
|---|---|---|
| PATENT NO. | : 7,477,693 B2 | |
| APPLICATION NO. | : 11/749523 | |
| DATED | : January 13, 2009 | |
| INVENTOR(S) | : Subramaniam et al. | |

It is certified that error appears in the above-identified patent and that said Letters Patent is hereby corrected as shown below:

Column 15, line 1, Claim 2: "B" to read as --$\underline{B}$--

Column 15, line 2, Claim 2: "$W_K$" to read as --$\underline{W}_K$--

Column 15, line 4, Claim 2: "$H_K$" to read as --$\underline{H}_K$--

Column 15, line 38, Claim 7: "A" to read as --$\underline{A}$--

Column 15, line 39, Claim 7: "$W_K$" to read as --$\underline{W}_K$--

Column 15, line 41, Claim 7: "$^h$ is a" to read as --$^H$ is a--

Column 16, line 46, Claim 16: "Fourier transforms of a first matrix," to read as --Fourier transforms of a first matrix--

Column 16, line 47, Claim 16: "first channel estimate," to read as --first channel estimate--

Signed and Sealed this
Nineteenth Day of July, 2011

David J. Kappos
*Director of the United States Patent and Trademark Office*